US009124585B1

(12) United States Patent
Yen et al.

(10) Patent No.: US 9,124,585 B1
(45) Date of Patent: Sep. 1, 2015

(54) FRAMEWORK FOR MAPPING NETWORK ADDRESSES TO HOSTS IN AN ENTERPRISE NETWORK

(71) Applicant: EMC Corporation, Hopkinton, MA (US)

(72) Inventors: Ting-Fang Yen, Cambridge, MA (US); Kaan Onarlioglu, Brookline, MA (US)

(73) Assignee: EMC Corporation, Hopkinton, MA (US)

( * ) Notice: Subject to any disclaimer, the term of this patent is extended or adjusted under 35 U.S.C. 154(b) by 206 days.

(21) Appl. No.: 13/731,643

(22) Filed: Dec. 31, 2012

(51) Int. Cl.
*G06F 15/16* (2006.01)
*H04L 29/12* (2006.01)

(52) U.S. Cl.
CPC ...................................... *H04L 61/10* (2013.01)

(58) Field of Classification Search
None
See application file for complete search history.

(56) References Cited

U.S. PATENT DOCUMENTS

| | | | |
|---|---|---|---|
| 2009/0007220 A1* | 1/2009 | Ormazabal et al. | 726/1 |
| 2009/0099866 A1* | 4/2009 | Newman | 705/2 |
| 2010/0161535 A1* | 6/2010 | Sen et al. | 706/46 |
| 2010/0313264 A1* | 12/2010 | Xie et al. | 726/22 |
| 2013/0179566 A1* | 7/2013 | Jreij et al. | 709/224 |

FOREIGN PATENT DOCUMENTS

| | | |
|---|---|---|
| CN | 102594625 A | 7/2012 |
| WO | 2013014672 A1 | 1/2013 |

* cited by examiner

*Primary Examiner* — Melvin H Pollack
*Assistant Examiner* — Oluwatosin Gidado
(74) *Attorney, Agent, or Firm* — BainwoodHuang

(57) ABSTRACT

Mapping network addresses in logs of network activity to corresponding host computers includes generating lists of known-dynamic addresses, static addresses and other-dynamic addresses from network addresses appearing in the logs. The static addresses and other-dynamic addresses are assigned to host computers having respective first host identifiers, and the known-dynamic addresses are associated with corresponding host computers having respective second host computer identifiers contained in dynamic address assignment activity. For the static and other-dynamic addresses, the first host identifiers are obtained, and first address-to-host bindings are created for address-based lookups of first host identifiers using respective addresses. For the known-dynamic addresses, the second host computer identifiers and log-time information from the dynamic address activity are used to create second address-to-host bindings usable to perform address-based lookup of second host identifiers and corresponding use-time information using respective addresses to which the second host identifiers are bound.

24 Claims, 5 Drawing Sheets

FRAMEWORK FOR MAPPING NETWORK ADDRESSES TO HOSTS IN AN ENTERPRISE NETWORK

BACKGROUND

The present application relates to the field of computer system monitoring, and more particularly to the use of information appearing in logs of computer system activity.

Computer systems and devices make extensive use of logs to collect information regarding computer system operation. Log information can be used for a variety of purposes including accounting, troubleshooting, and various types of monitoring including security-related monitoring. For example, security information and event management (SIEM) systems are known that receive logs generated by devices such as servers, network devices, etc., and use the information in the logs to assess system operation from a security perspective.

SUMMARY

In many cases it is desirable that a computer system monitoring function be able to associate activity information (such as from log files) with specific hosts involved with the activity, and to do this for an extended period of weeks, months or longer. In one example, a threat detection system for detecting advanced persistent threats or APTs monitors computer system activity over an extended period to build a profile of normal operation, then compares subsequent activity to the profile to detect any differences or anomalies that may indicate APT activity. In such a system it is generally necessary to ensure that reported activity is accurately and consistently associated with respective hosts over the entire period.

Network monitoring and logging devices/components (e.g. firewalls, web proxies, etc.) record network addresses such as Internet Protocol (IP) addresses of network entities in the log messages they generate. In many cases a network address alone may not be sufficient to uniquely identify a host computer (host) whose activity is recorded in logs collected over an extended period. Especially in large enterprises, many IP addresses are dynamically and temporarily leased to hosts using the Dynamic Host Configuration Protocol (DHCP) for example, causing the IP addresses of hosts to change over time. Moreover, even the hosts with static IP addresses become difficult to track due to the infeasibility of thoroughly documenting the static IP address assignments in complex networks with blurred geographical boundaries and frequently changing network configurations.

A framework is described for creating a mapping of network addresses such as IP addresses to unique hosts over time in a large enterprise network. The technique leverages log messages generated by network monitoring devices, including for example web proxies, firewalls, Windows domain controllers, VPN servers, and DHCP servers, as collected by a SIEM (Security Information and Event Management) system. In one embodiment, a SIEM system known as enVision™ sold by RSA Security, Inc. may be employed.

One particular technical challenge is incomplete and/or imperfect data. It generally is not known a priori whether an IP address is static or dynamic. Also, log timestamps are reported in different time zones, depending on the clock configuration of the logging devices, so any time-dependent processing must take this into consideration. One other major issue is that the logs are generally incomplete. For example, some events may not be reported by a logging device; logs may be dropped before they reach the SIEM; and the logs may not contain information about privately managed IP subnetworks that are not administered by the central IT department.

The challenges are addressed by different aspects of the disclosed techniques. First, a method is used for automatically classifying an IP address as static or dynamic. This method does not require input from network administrators and creates minimal bandwidth overhead. Second, supplementary information about the clock configuration of logging devices is used to adjust log timestamps into a known consistent time reference, such as UTC. Lastly, the corrected timeline of events is used to fill in missing data and construct a mapping of dynamically assigned IP addresses to unique hosts over time.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views.

DETAILED DESCRIPTION

Figure 1:
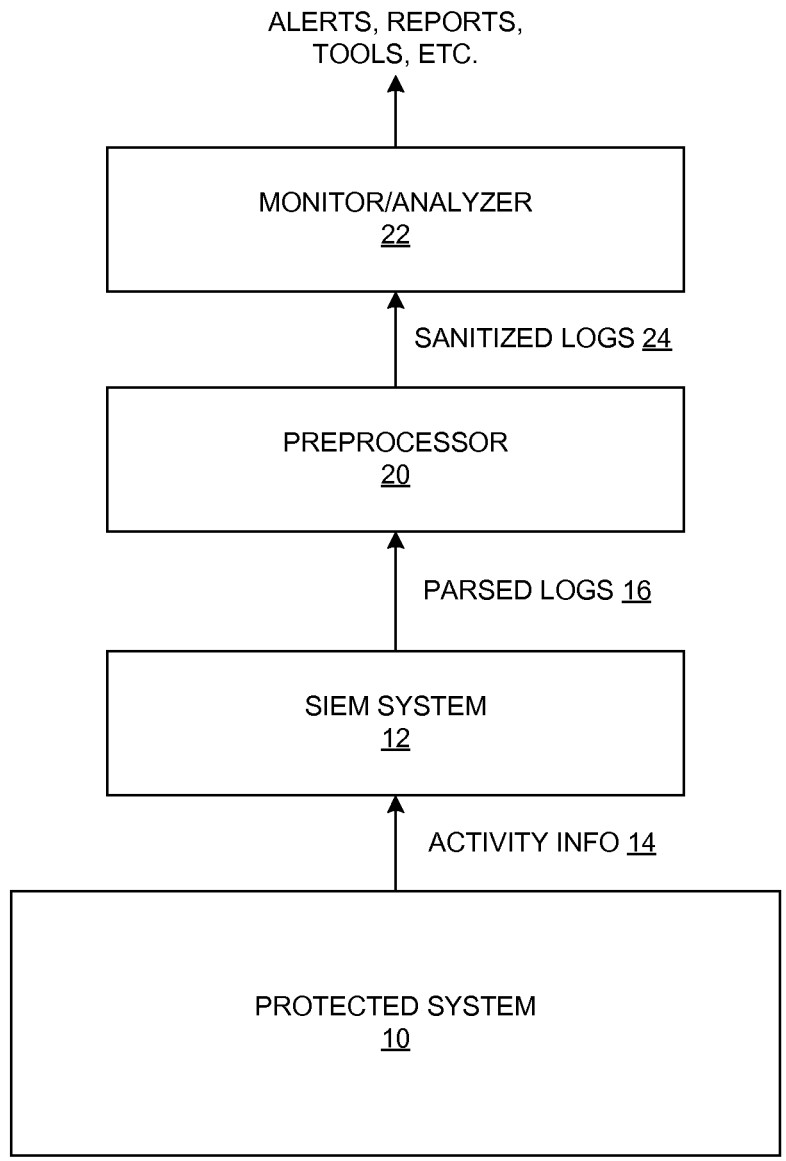
FIG. 1 is a block diagram of a networked computer system.

FIG. 1 shows a computing system augmented by monitoring and/or protection elements. In particular, the system includes a protected distributed computing system (PROTECTED SYSTEM) 10 and a security information and event management (SIEM) system 12 continually receiving a wide variety of system activity information 14 from operational components of the protected system 10. The SIEM system generates parsed logs 16 of logged activity information which are provided to monitoring/protection system including a preprocessor 20 and a monitor/analyzer 22. The preprocessor 20 generates sanitized logs 24 for use by the monitor analyzer 22, which in turn provides user-level functionality to a separate human or machine user, the functionality including things like alerts, reports, interactive tools for controlling or augmenting operations, etc.

The protected system 10 is generally a wide-area distributed computing system, such as a large organizational network. It may include one or more very large datacenters, as well as a number of smaller or "satellite" datacenters, all interconnected by a wide-area network that may include public network infrastructure (Internet) along with private networking components such as switches and routers, firewalls, virtual private network (VPN) components, etc. Each datacenter includes local resources such as server computers (servers), client computers and storage systems, coupled together using local/intermediate networks such as local-area networks (LANs), metro-area networks (MANs), storage-area networks (SANs), etc.

The SIEM system 12 is a specialized computing system including hardware computing components executing specialized SIEM software components, including a large database for storing the parsed logs 16. The SIEM system 12 receives raw logs (not shown) generated by logging devices in the system and performs basic parsing into fields (e.g. IP address, timestamp, msg ID, etc.) to produce the parsed logs 16. In one embodiment the SIEM system may utilize a SIEM product known as enVision™ sold by RSA Security, Inc., the security division of EMC Corporation. The SIEM system 12 gathers the raw logs generated by different devices within the protected system 10 and stores the parsed logs 16 in the database, functioning as a centralized repository. The logs 16 need to be stored for some period of time (e.g., at least several months) in order to enable the analysis described herein.

The monitor/analyzer 22 may be any of a variety of types of tools for system monitoring as well as other functions, including security-related functions. It may be primarily software-implemented, utilizing hardware resources of the SIEM system 12 or in some cases its own dedicated hardware computers. Both the monitor/analyzer 22 and the preprocessor 20 are described herein as collections of functional components. As described below, these are to be understood as one or more general-purpose computers executing specialized software for realizing each function.

In one embodiment the monitor/analyzer 22 and preprocessor 20 are components of a threat detection system that may employ both top-down and bottom-up components. A top-down component builds and utilizes templates based on known information about current and prior advanced persistent threat or APT attacks, and these templates are used in analysis for detecting behavior that may be indicative of such attacks. The bottom-up component gathers, stores and processes the system activity information as reflected in the sanitized logs 24 from the preprocessor 20. The bottom-up component may include, inter alia, sensors and correlators. Examples of sensors include a command-and-control (C & C) sensor, login sensor, applications sensor and critical-servers sensor. The correlators work from output of the sensors in the form of reports. Examples of correlators include C & C and new application correlator, unusual login correlator and outbound connections correlator.

Figure 2:
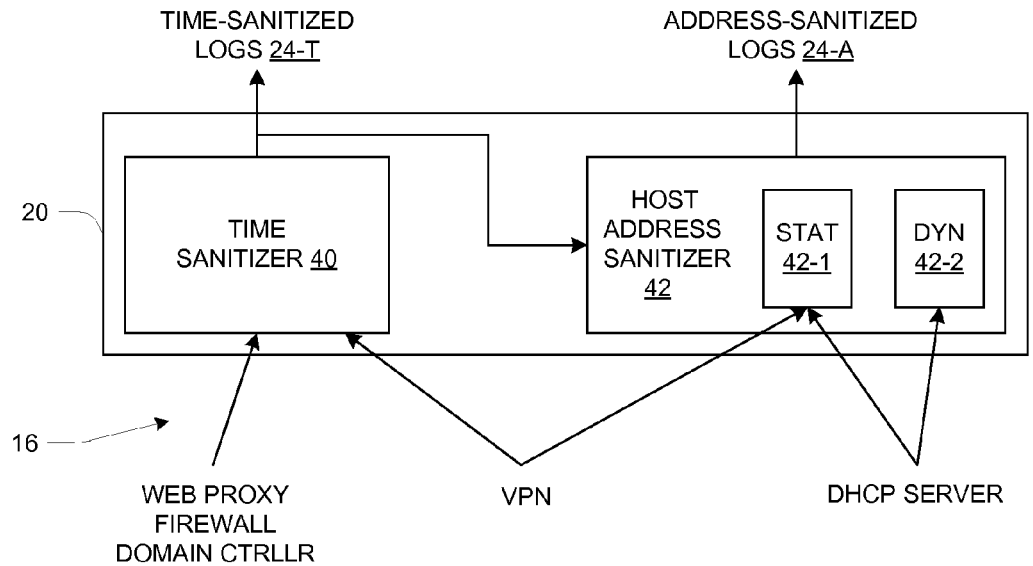
FIG. 2 is a block diagram of a preprocessor.

FIG. 2 shows the preprocessor 20. Because of inconsistencies in the parsed logs 16 (out-of-order events, time skew, missing events, etc.), the parsed log data needs to be processed and sanitized before any analysis is attempted. To this end, the preprocessor 20 includes a time sanitizer 40 and a host address sanitizer 42, these generating time-sanitized logs 24-T and address-sanitized logs 24-A respectively. The host address sanitizer 42 includes a first sanitizer (STAT) 42-1 for static host addresses and a second sanitizer (DYN) 42-2 for dynamic host addresses. Example parsed log inputs 16 are shown, including logs from web proxies, firewalls, domain controllers, VPN components, and Dynamic Host Control Protocol (DHCP) servers. Specific aspects of the preprocessor 20 are described below.

For time sanitization, the parsed logs 16 are sanitized so that all log entries for all devices are reported in one consistent time, such as UTC time. The sanitization procedure is done by the time sanitizer 40 as described more below.

With respect to host addresses, it is generally necessary to address inconsistencies arising from dynamic IP address assignments, as well as to develop lists of static IP addresses active in the enterprise. It is also necessary to address inconsistencies in the time-stamping of log data from devices in different time zones and using different time-zone configurations.

To deal with dynamic IP addresses (IPs), it is necessary to develop a consistent mapping between network (IP) addresses and hostnames/MAC addresses. This is done by parsing DHCP and VPN logs as described in more detail below. The outcome of this pre-processing may be stored in a database table with certain fields as shown below. Users can query this table directly. There may also be an interface (e.g., a web form) for accessing this information.

| Column Name | Description |
| --- | --- |
| Start_time | The start timestamp when this IP is allocated to the host. |
| End_time | The end timestamp when this IP is no longer allocated to the host. |
| Ipaddr | The IP address. |
| Hostname | The hostname. |
| Macaddr | The host's MAC address. |

To study hosts that are assigned static IP addresses, IP addresses may be examined that do not appear in DHCP and VPN logs. For example, these IPs may be obtained from security gateway logs and host operating system (e.g., Windows) event logs. The hostname associated with those IP addresses may be looked up (e.g., by reverse DNS resolution using tools such as "nslookup" or "host") repeatedly over time. An IP address that always resolves to the same hostname is considered static.

Below is provided additional description of the structure and operation of the host address sanitizer 42. The description is given with particular reference to Internet Protocol (IP) addresses, but it will be clear to those skilled in the art that the technique may be more generally applicable to non-IP network architectures with suitable modifications as required.

As generally known, an IP address can either be static or dynamic. A static IP address is one that is assigned to a particular machine for an indefinitely long time, generally until some event such as network reconfiguration requires address reassignment. This period may be months or years in duration. A dynamic IP address is one that is only temporarily assigned ("leased") to any given machine for a generally much shorter period, and may be assigned to several different machines over different periods. One well-known network protocol for managing the assignment of dynamic IP address is the Dynamic Host Configuration Protocol (DHCP).

Distinguishing between static and dynamic IP addresses is important to the goal of mapping IP addresses to unique hosts. However, in large enterprise networks, documentation about the use and configuration of individual IP address ranges is often scarce or non-existent. While a large subset of dynamic IP addresses (e.g., those administered by the corporate IT department) can be inferred from logs collected from designated DHCP servers, it is much more difficult to identify static IP addresses and also dynamic IP addresses managed by "private" DHCP servers, i.e., local DHCP servers deployed in small or remote networks whose DHCP traffic is not visible to more centralized monitoring systems such as the SIEM system 12.

Figure 3:
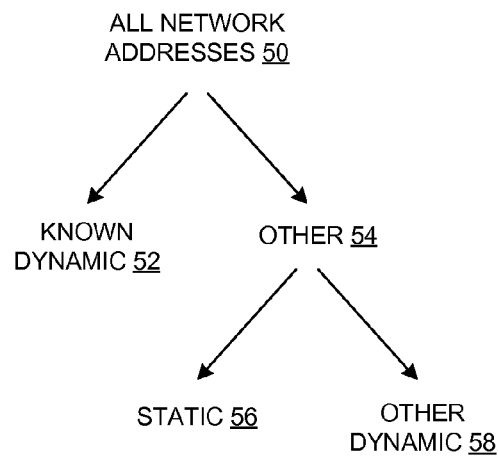
FIG. 3 is a schematic diagram of an address taxonomy.

A method is described of classifying IP addresses into three distinct groups: (1) known dynamic IP addresses (generally managed centrally by the IT department), (2) other dynamic IP addresses (managed by private DHCP servers to which the IT department lacks visibility), and (3) static IP addresses. The classification is shown schematically in FIG. 3. The set of all network addresses 50 is divided between known dynamic addresses 52 and other addresses 54, which are further divided into static addresses 56 and other dynamic addresses 58.

In one embodiment a tool for classifying IP addresses regularly (e.g., daily) extracts all the IP addresses that appear in network logs to create a large enterprise IP address pool. Similarly, it extracts dynamic IP addresses from logs that are known to include only dynamic IP addresses, such as the logs from IT-managed DHCP servers collected by the SIEM system 12. By taking the difference between these two IP address pools, resolving the names of the hosts assigned to the resulting IP addresses, and continuously monitoring those hosts for IP address re-assignments, the tool automatically maintains up-to-date and self-correcting lists of static IP addresses 56 and other dynamic IP addresses 58.

Figure 4:
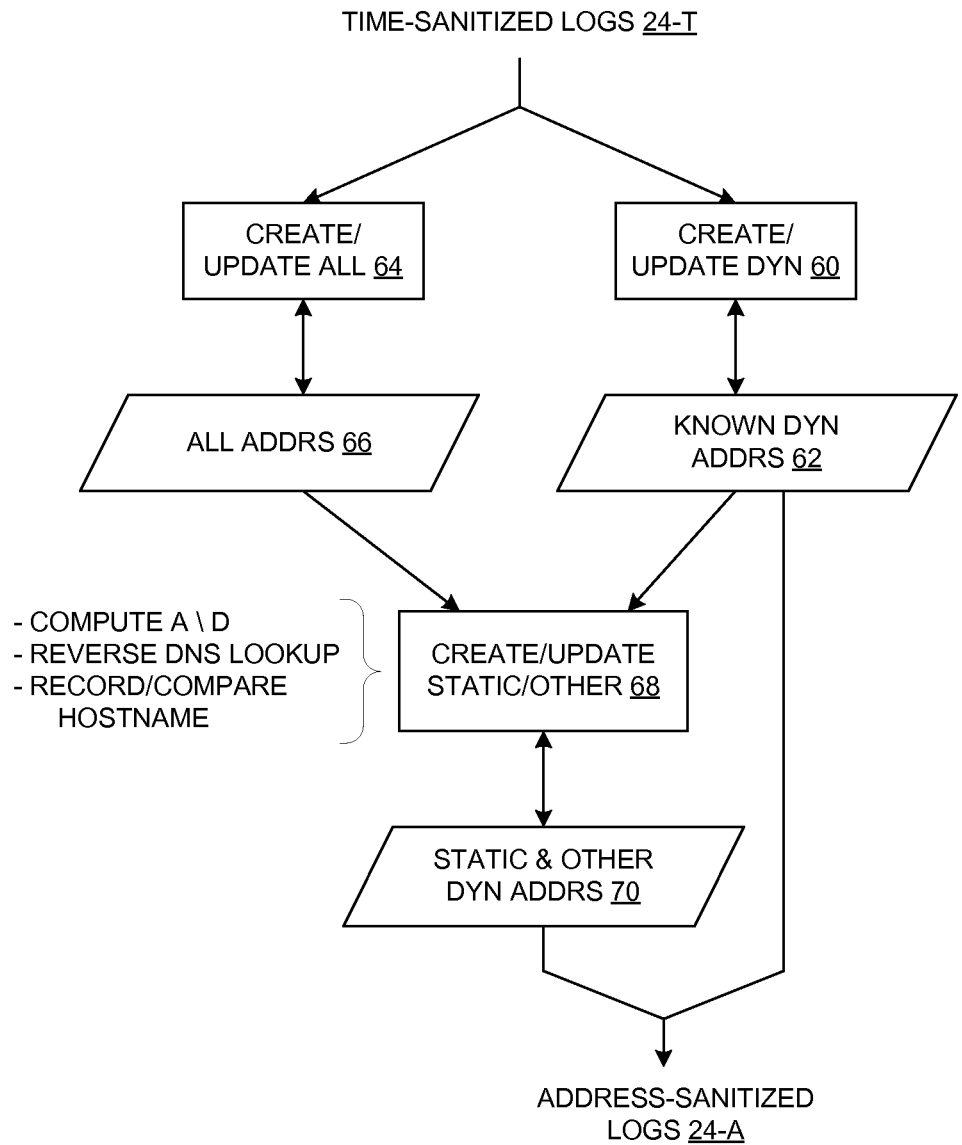
FIG. 4 is a flow diagram for an address sanitization process.

Operation of the tool is described with reference to FIG. 4. In general, the tool may be designed to perform a one-time bootstrap cycle to initialize its operations and data, and then run a periodic (e.g., daily) update cycle. These two separate cycles are both explained below with reference to FIG. 4. As shown, the process operates using the data from the time-sanitized logs 24-T. Further below is a brief description of operation of the time sanitizer 40 in creating those logs.

BOOTSTRAP Cycle

During this cycle, the tool builds its IP address pools and identifies a set of undetermined, but potentially static, IP addresses.

1. At 60, create a set 62, referred to as D, of known dynamic IP addresses by extracting the IP addresses that appear in sanitized DHCP and VPN logs.
2. At 64, create a set 66, referred to as A, of all IP addresses internal to the enterprise by extracting the IP addresses that appear in logs from various other network devices (e.g., IronPort Logs, Windows Event logs).
3. At 68, create a set 70, referred to as S, as the difference between A and D. This is the set of undetermined (but potentially static) IP addresses, S=A\D. As shown, this process includes the following:
   Compute A\D
   Perform a reverse DNS lookup for every IP address in S
   Record the hostnames for the IP addresses as returned by DNS As shown, the combination of the set 62 of known dynamic IP addresses and the set 70 of static and other dynamic IP addresses make up the address-sanitized logs 24-A that are provided to the monitor/analyzer 22 for use in the system monitoring/analysis functions.

UPDATE Cycle

The tool automatically runs an UPDATE cycle at regular intervals, e.g., daily, in order to update the IP address pools and classify IP addresses in the set 70 as static or dynamic.

1. At 60, create a new set of known dynamic IP addresses Dnew for that day by extracting the IP addresses that appear in DHCP and VPN logs. Merge with the existing set to create an updated set 62 of known dynamic IP addresses containing the new and old addresses, Dupdated=Dnew∪Dold.
2. At 64, create a new set of all IP addresses Anew by extracting the IP addresses that appear in logs from various other network devices (e.g., IronPort Logs, Windows Event logs). Merge with the old set to create an updated set 66 of all IP addresses containing the new and old addresses, Aupdated=Anew∪Aold.
3. At 68, update the set 70 of static and other dynamic IP addresses:
   a) Compute the difference between Aupdated and Dupdated and create an updated set 70 of undetermined (but potentially static) IP addresses S=Aupdated\Dupdated.
   b) Perform a reverse DNS lookup for every IP address in the set S and record the corresponding hostname
   c) For each IP address in S that was also observed in a previous bootstrap or update cycle, compare its previously resolved hostname with the newly resolved name:
      i) If they differ (i.e., the host changed IP addresses), classify the IP address as other dynamic (i.e., the host is not using a static IP address, and likely being managed by a DHCP server into which the IT department lacks visibility). Move the IP address into the set of previously unknown dynamic IP addresses, Dunknown
      ii) If they are the same, the IP address is kept in S.

The tool may be designed to auto-correct its outputs over time. The longer an IP address is monitored, the higher the confidence in its classification.

Constructing IP-to-Host Mappings

Ideally, a mapping between IP addresses and corresponding unique hosts should include the following information: The IP address, a unique identifier for the host, and the start and end timestamps of the period during which the host is assigned this IP address.

In contrast to static IP addresses, which are permanently assigned to the same machine, dynamic IP addresses are allocated to different machines at different time periods. This process takes place over the DHCP protocol. Below is described a process for parsing DHCP logs collected by the SIEM system 12 to construct a mapping of the known dynamic IP addresses 62 to unique hosts, including features that address the challenge of incomplete log data. Hosts are uniquely identified by the MAC addresses of the network interface.

DHCP (Dynamic Host Configuration Protocol) is used in the dynamic assignment of IP addresses and other network parameters for client hosts connecting to the network. Dynamic IP addresses are leased to hosts for a given time period, after which the host must renew its IP assignment request, otherwise the DHCP server may reclaim that IP for use by another host.

Figure 5:
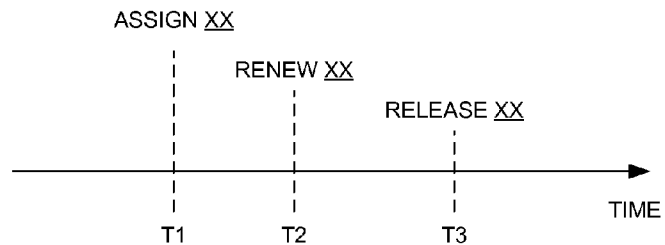
FIG. 5 is a timeline representation of messages for a dynamically leased address.

FIG. 5 illustrates the sequence of DHCP events involved in the assignment of an IP address to a particular host (in the common case). At T1, an IP address is assigned (leased) to the host. At a later time T2, the assignment (lease) is renewed, enabling the host to continue using the originally assigned IP address. Many renewals may occur over a long period. At some subsequent time T3, the assignment is released, meaning that the IP address is no longer assigned for use by the host.

For the purpose of constructing IP-to-host mappings, the following are relevant DHCP message types. The message IDs given below are specific to a particular commercial implementation of DHCP and are used only for convenient reference herein.

| Message ID | Description |
| --- | --- |
| 10 | Assign: A new IP address is leased to a client. |
| 11 | Renew: A lease is renewed by a client. |
| 12 | Release: A lease is released by a client. |
| 13 | Conflict: An IP address is found in use on the network. |
| 16 | Delete: The lease is deleted. |
| 18 | Expire: The lease is expired. |

The process makes use of DHCP log messages generated by DHCP servers in the protected computer system 10 and collected by the SIEM system 12. In particular, the following information in DHCP logs is considered:

| Field Name | Description |
| --- | --- |
| Event_time | The timestamp when the log was generated |
| Saddr | The IP address |
| Shost | The hostname |
| Smacaddr | The host's MAC address |
| Msg_id | The message ID for the DHCP log (per above or other scheme) |

An IP-to-host mapping is the allocation of an IP address to a particular host for a continuous period of time. It is referred to herein as a "binding" and identified by the tuple {hostname, MAC address}. The following table describes the format of each binding:

| Field Name | Description |
| --- | --- |
| Start_time | The start timestamp when this IP is allocated to the host |
| End_time | The end timestamp when this IP is no longer allocated to the host |
| Ipaddr | The IP address |
| Hostname | The hostname |
| Macaddr | The host's MAC address |

In addition to identifying the static and other dynamic IP addresses 70 and synchronizing log timestamps, another technical challenge in constructing accurate IP-to-host mappings is presented by incomplete datasets.

In particular, the DHCP logs may be incomplete in two ways. First, they only record the attempt, and not the outcome, of an action. As a result, the appearance of an "assign" message does not necessarily mean that an IP assignment happened, only that the DHCP server attempted to do so. The assignment could fail due to conflicts (i.e., there is another host currently using that IP address), etc., which would only be apparent by examining subsequent logs. Second, while the sequence illustrated in FIG. 5 is representative of the normal case, sometimes only a partial subset of those events can be observed. Either (or both) the "assign" or "release" log messages can be missing, making it difficult to determine the correct start and end time of the IP assignment.

To overcome these challenges, the process can exploit the use of standardized log timestamps (represented in UTC time, as described below), and sort logs by time. This enables the course of assignment and release/expiration of an IP address to be followed in sequence, and for ambiguities to be resolved in cases when only partial information is available. This is described in more detail below.

As noted, the tuple {hostname, MAC address} is used as the unique identifier for a host. As described earlier, a mapping from IP address to host is called a "binding". A binding is said to be "closed" if the DHCP lease to that host for that IP has terminated, and said to be "open" otherwise.

The algorithm for parsing DHCP log messages is outlined below:

1) Translate DHCP log timestamps into UTC time, and sort the collected DHCP logs by UTC time.

2) For each IP address, sequentially examine logs associated with that IP address and take corresponding actions of creating, updating, or deleting bindings. These actions are taken as different message types for the IP address are encountered.

3) Output all "open" and "closed" bindings.

Figure 6:
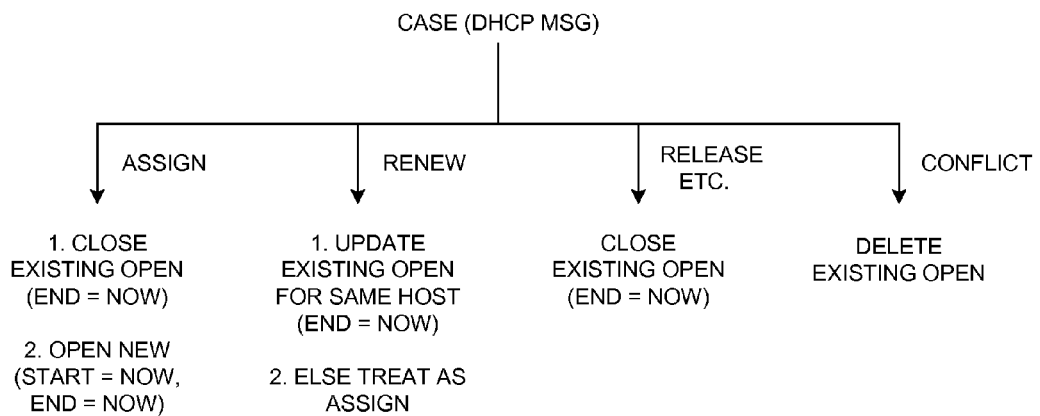
FIG. 6 is a flow diagram for processing DHCP messages from DHCP logs.

FIG. 6 illustrates the message-type processing of step 2) above in the form of a Case statement applied to each message encountered in the logs for a particular IP address. The pertinent cases are the following:

a) If this log message is an "Assign" event (i.e., Msg_id=10):
Terminate (close) any currently open binding on this IP address, if one exists (this is to handle any missing "release" messages). Create (open) a new binding on this IP address, setting both the start time and end time to the current time.

b) If this log message is a "Renew" event (i.e., Msg_id=11):
Update the existing open binding by setting its end time to be the current time. If no existing open binding for this IP address is found (indicative of a missing "release", for example), then treat this message in the same manner as an "Assign" message (per (a) above).

c) If this log message is a "Release", "Delete", or "Expire" event (i.e., Msg_id=12, 16, or 18):
If there is an open binding for this IP address, close it and set its end time to the current time. Note that this same action is taken whether the existing binding is for the same host or for some other host (which would be indicative of missing messages).

d) If this log message is a "Conflict" event (i.e., Msg_id=13):
Delete the most recent "open" binding on this IP address. Note that a conflict arises when the DHCP server attempts to assign an active IP address to another host, causing the later "assign" event to fail.

In cases where log messages corresponding to the termination of DHCP leases are missing, the above represents a conservative choice to use the timestamp of the last recorded log message for that DHCP lease as the end timestamp. Other choices would be use the start timestamp of the next binding on the same IP address (though this is inaccurate when the beginning of the next DHCP lease is also missing, e.g., no "assign" log message), or simply to extend by the time duration between consecutive DHCP lease renewals.

The above process can be performed periodically to retrieve newly collected DHCP logs and update the IP-to-host mappings (bindings) accordingly.

Time Sanitization

As mentioned above, the time sanitizer 40 performs preprocessing to obtain time correction values for the parsed logs 16 to generate the time-sanitized logs 24-T. It is assumed that a list of all logging devices that report to the SIEM 12 is known (e.g., a list of IP addresses of all logging devices). It is also assumed that the log timestamp translation is done after the logs are collected by the SIEM system 12, i.e., administrator privileges to the logging devices are not available, so that the devices' clock configurations cannot be modified.

The output of the technique is the time zone configuration of each logging device. This is stored in the following format:

| Field Name | Description |
| --- | --- |
| Paddr | IP address of the logging device |
| δ | Time difference (UTC - device, to nearest 15 minute interval) |

Given the above information for each logging device, all log timestamps can be translated into UTC by adding the corresponding δ value to the device timestamp. For example, if a timestamp for a parsed log 16 has the value T2, the adjusted log timestamp for that log message would become T2+δ.

Figure 7:
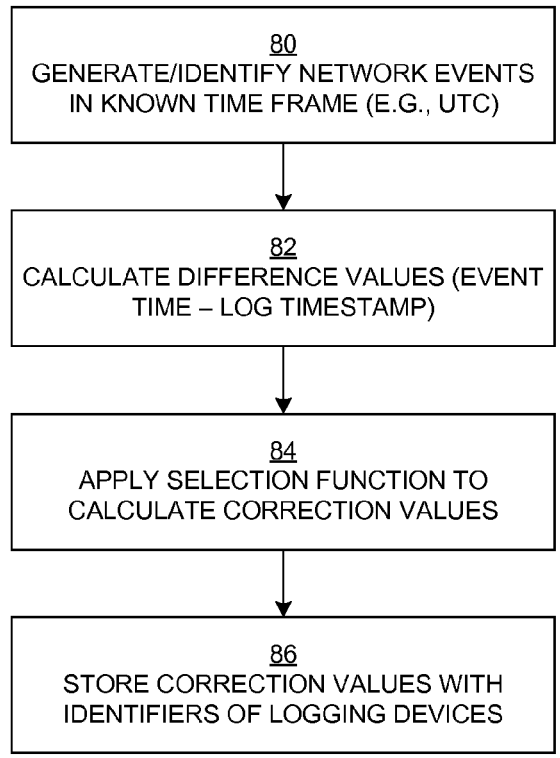
FIG. 7 is a flow diagram for a timestamp sanitization process.

FIG. 7 describes the general procedure by which the timestamp correction values δ are determined. At 80, network events occurring in a known time frame (e.g., UTC) are either generated or simply identified (if existing by action of a separate mechanism). Examples of both operations are given below. The network events are known to have corresponding entries with timestamps in the parsed logs 16. At 82, difference values are calculated, each being a difference between an event time in the known time frame and a timestamp of the parsed log entry. At 84, a selection function is applied to the difference values to obtain a correction value for each logging device. At 86, the correction values are stored in association with respective identifiers of the logging devices (e.g., the IP address values Paddr).

Two different approaches are described for the general process of FIG. 7.

1. Active Approach

One direct approach to detect a device's configured time zone is to send it "probes" over the network soliciting responses containing clock information. This is difficult in practice, because neither the IP, UDP, or TCP headers include timestamps. Also, for security reasons many machines ignore packets sent to unused ports.

In an alternative active approach, rather than contacting a logging network device directly, events are generated that will be logged (and time-stamped) by the device. For example, a Windows domain controller validates user logon events and generates logs describing the outcome of the logon attempts as it does so. Thus, log entries and timestamps can be created by performing logons. As another example, a web proxy forwards clients' HTTP requests and generates logs describing the network connection at the same time. Log entries and timestamps can be created by issuing HTTP requests.

Let the known time at which a testing event E is generated be TE, which is represented in UTC time. After the logging device processes this event, a log message is created with the device's timestamp TD. In terms of elapsed time, the difference between TE and TD is very small, e.g., on the order of milliseconds, because the same device often performs event processing and log generation. This is true in both the above examples (Windows domain controller, web proxy).

The difference value δ=TD−TE can be calculated, rounded off to the nearest 15 minutes (since that is the level of granularity at which time zones are set). Since TE is represented in UTC time, the device's time zone is hence known to be configured as UTC time−δ.

2. Passive Approach

While the active approach can be quite accurate and efficient, it may not be suitable for use in a large network with many different logging devices. In this case, events may be directed to different processing/logging devices depending on the source host's geographic location or network configuration. Without a comprehensive understanding of the topology of the enterprise network and access to multiple distributed client machines, the active approach may become infeasible.

An alternative passive approach may leverage information available in logs collected by a SIEM system to determine the devices' clock configuration. In this case, the "event" used for calculating correction values is the receipt by the SIEM system 12 of a log message from a logging device. Such an event is not actively generated, but rather simply identified by examining the SIEM system timestamps. The clock configuration in the SIEM system 12 may be static, which simplifies the processing. For example, the SIEM system 12 may generate all its timestamps in UTC time.

At a high level, the passive approach compares the device timestamp TD with the SIEM system timestamp TS for all log messages generated by a logging device, where the SIEM system timestamp TS reflects the time that the SIEM system 12 received the log messages. Let δ be the difference between TD and TS, rounded off to the nearest 15 minutes. From a set of (possibly inconsistent) δ values derived from all logs generated by a device over a certain time period (e.g., one month), the correct actual time correction value for the device is then determined. This determination may involve statistical inference based on the distribution of δ values. If all the values are equal, then there is a high confidence that the single value is the proper correction value to use. If there is a distribution of different values, then it may be necessary to identify the value having the highest frequency or satisfying some other criteria. If there is high variance, it may not be possible to automatically select an appropriate correction value with any confidence, and in such case it may be necessary to resort to supplemental mechanisms.

Figure 8:
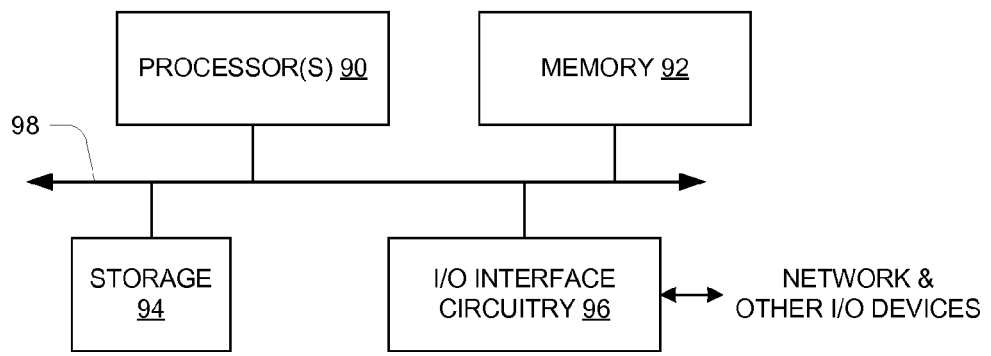
FIG. 8 is a block diagram of a computer from a hardware perspective.

FIG. 8 is a generalized depiction of a computer such as may be used to realize the computers in the system, including hosts of the protected system 10 whose activities are monitored as well as computers implementing the SIEM system 12, monitor/analyzer 22 and preprocessor 20. It includes one or more processors 90, memory 92, local storage 94 and input/output (I/O) interface circuitry 96 coupled together by one or more data buses 98. The I/O interface circuitry 96 couples the computer to one or more external networks, additional storage devices or systems, and other input/output devices as generally known in the art. System-level functionality of the computer is provided by the hardware executing computer program instructions (software), typically stored in the memory 92 and retrieved and executed by the processor(s) 90. Any description herein of a software component performing a function is to be understood as a shorthand reference to operation of a computer or computerized device when executing the instructions of the software component. Also, the collection of components in FIG. 6 may be referred to as "processing circuitry", and when executing a given software component may be viewed as a function-specialized circuit, for example as an "analyzer circuit" when executing a software component implementing an analyzer function.

While various embodiments of the invention have been particularly shown and described, it will be understood by those skilled in the art that various changes in form and details may be made therein without departing from the scope of the invention as defined by the appended claims.

In addition to use in classifying static and dynamic IP addresses, the presently disclosed technique may also be applied in obtaining insight into parts of the network infrastructure where the IT department has low or no visibility. This can help correct misconfigurations and identify potential points of vulnerability.

What is claimed is:

1. A method of mapping network addresses appearing in logs of network activity to corresponding uniquely identified host computers in a computer network, comprising:

generating respective lists of known-dynamic addresses, static addresses and other-dynamic addresses from the network addresses appearing in the logs, the known-dynamic addresses appearing in logs of dynamic address assignment activity in the network, wherein the logs of dynamic address assignment activity in the network include at least one dynamic host configuration protocol (DHCP) log, wherein the DHCP log includes the known-dynamic addresses and indicates previous assign, renew, and release DHCP log messages, including at least one log message indicating that an assignment of one of the known-dynamic addresses to one of the host computers was renewed, the static addresses and other-dynamic addresses computed as a difference between a list of all the network addresses and the known-dynamic addresses, the static addresses and other-dynamic addresses being assigned to corresponding host computers having respective first host identifiers, the known-dynamic addresses being directly and temporally associated with corresponding host computers having respective second host computer identifiers contained in the dynamic address assignment activity;

for the static and other-dynamic addresses, obtaining the first host identifiers of the host computers to which the addresses are assigned, and creating first address-to-host bindings usable to perform address-based lookups of first host identifiers using respective addresses to which the first host identifiers are bound; and for the known-dynamic addresses, utilizing the second host computer identifiers and log-time information contained in the dynamic address activity to create second address-to-host bindings, the second address-to-host bindings including use-time information describing times of use of the addresses by the corresponding host computers, the second address-to-host bindings being usable to perform address-based lookup of second host identifiers and corresponding use-time information using respective addresses to which the second host identifiers are bound.

2. A method according to claim 1, being performed a first time as an initialization and multiple subsequent times as updates, each update adding newly created first and second address-to-host bindings to existing first and second address-to-host bindings from the initialization or a preceding update.

3. A method according to claim 2, including the following steps performed during each update:

for each address appearing in a current log that was previously classified as a static address and having a corresponding existing first host identifier, obtain a current first host identifier for the address and compare the current first host identifier with existing first host identifier for the address to generate a comparison result;

if the comparison result indicates that the current and existing first host identifiers are the same, then maintain an existing first address-to-host binding including the existing first host identifier for the address; and if the comparison result indicates that the current and existing first host identifiers are not the same, then classify the address as other-dynamic and create a new first address-to-host binding associating the address with the current host identifier.

4. A method according to claim 1, wherein the logs are time-sanitized logs derived from raw logs generated by logging devices, and further including performing time sanitization to information of the raw logs to obtain the time-sanitized logs, the time sanitization including (1) examining time differences between events occurring in a known time reference frame and corresponding log entries recorded in respective device times of the logging devices, and (2) generating respective timestamp correction values for the logging devices based on the time differences.

5. A method according to claim 1, wherein:

the use-time information of each binding includes a start time and an end time of a period during which an address is assigned to a host identified by a host identifier;

the address-assignment activity for each binding includes an assign event occurring at a starting time and an de-assign event occurring at an ending time, and creating the second address-to-host bindings includes parsing the logs to identify assign events and de-assign events and corresponding timestamps.

6. A method according to claim 5, wherein:

an assign event results in creation of an open binding having a start time equal to a time of occurrence of the assign event;

the address-assignment activity further includes renew events each specifying renewal of an address assignment previously made;

a renew event for an address is processed by (i) if an open address-to-host binding for the address exists, updating the end time of the binding to be equal to a timestamp for the renew event, and (ii) if no open address-to-host binding for the address exists, then processing the renew event as an assign event for the address.

7. A method according to claim 5, wherein a de-assign event for an address results in closing of an open address-to-host binding for the address.

8. A method according to claim 7, wherein a de-assign event is indicated by any one of a release message, a delete message and an expiration message, the release message being issued by a host when the host's use of an address has ended, the delete and expiration messages being issued by an address-assignment server to indicate ending of a allotted period of host use of an address.

9. A method according to claim 7, wherein an assign event for an address to a given host includes, in the event that an open address-to-host binding for the address and a different host exists, closing the existing open address-to-host binding for the address and the different host.

10. A method according to claim 5, wherein:

the address-assignment activity for an address includes a renew event occurring between the assign event and the de-assign event; and a renew event for an address is processed by updating the end time of an open address-to-host binding for the address, the end time being updated to a timestamp for the renew event.

11. A method according to claim 1, wherein the host identifier includes a hostname and a media access controller address uniquely identifying a network interface circuit used by a host.

12. A non-transitory computer-readable medium having computer program instructions stored thereon, the computer program instructions being executable by one or more computers to cause the computers to perform a method of mapping network addresses appearing in logs of network activity to corresponding uniquely identified host computers in a computer network, the method including:

generating respective lists of known-dynamic addresses, static addresses and other-dynamic addresses from the network addresses appearing in the logs, the known-dynamic addresses appearing in logs of dynamic address assignment activity in the network, wherein the logs of dynamic address assignment activity in the network include at least one dynamic host configuration protocol (DHCP) log, wherein the DHCP log includes the known-dynamic addresses and indicates previous assign, renew, and release DHCP log messages, including at least one log message indicating that an assignment of one of the known-dynamic addresses to one of the host computers was renewed, the static addresses and other-dynamic addresses computed as a difference between a list of all the network addresses and the known-dynamic addresses, the static addresses and other-dynamic addresses being assigned to corresponding host computers having respective first host identifiers, the known-dynamic addresses being directly and temporally associated with corresponding host computers having respective second host computer identifiers contained in the dynamic address assignment activity;

for the static and other-dynamic addresses, obtaining the first host identifiers of the host computers to which the addresses are assigned, and creating first address-to-host bindings usable to perform address-based lookups of first host identifiers using respective addresses to which the first host identifiers are bound; and for the known-dynamic addresses, utilizing the second host computer identifiers and log-time information contained in the dynamic address activity to create second address-to-host bindings, the second address-to-host bindings including use-time information describing times of use of the addresses by the corresponding host computers, the second address-to-host bindings being usable to perform address-based lookup of second host identifiers and corresponding use-time information using respective addresses to which the second host identifiers are bound.

13. A non-transitory computer-readable medium according to claim 12, wherein the method is performed a first time as an initialization and multiple subsequent times as updates, each update adding newly created first and second address-to-host bindings to existing first and second address-to-host bindings from the initialization or a preceding update.

14. A non-transitory computer-readable medium according to claim 13, wherein the method includes the following steps performed during each update:

for each address appearing in a current log that was previously classified as a static address and having a corresponding existing first host identifier, obtain a current first host identifier for the address and compare the current first host identifier with existing first host identifier for the address to generate a comparison result;

if the comparison result indicates that the current and existing first host identifiers are the same, then maintain an existing first address-to-host binding including the existing first host identifier for the address; and if the comparison result indicates that the current and existing first host identifiers are not the same, then classify the address as other-dynamic and create a new first address-to-host binding associating the address with the current host identifier.

15. A non-transitory computer-readable medium according to claim 12, wherein the logs are time-sanitized logs derived from raw logs generated by logging devices, and wherein the method further includes performing time sanitization to the information of the raw logs to obtain the time-sanitized logs, the time sanitization including (1) examining time differences between events occurring in a known time reference frame and corresponding log entries recorded in respective device times of the logging devices, and (2) generating respective timestamp correction values for the logging devices based on the time differences.

16. A non-transitory computer-readable medium according to claim 12, wherein:

the use-time information of each binding includes a start time and an end time of a period during which an address is assigned to a host identified by a host identifier;

the address-assignment activity for each binding includes an assign event occurring at a starting time and an de-assign event occurring at an ending time, and creating the second address-to-host bindings includes parsing the logs to identify assign events and de-assign events and corresponding timestamps.

17. A non-transitory computer-readable medium according to claim 16, wherein:

an assign event results in creation of an open binding having a start time equal to a time of occurrence of the assign event;

the address-assignment activity further includes renew events each specifying renewal of an address assignment previously made;

a renew event for an address is processed by (i) if an open address-to-host binding for the address exists, updating the end time of the binding to be equal to a timestamp for the renew event, and (ii) if no open address-to-host binding for the address exists, then processing the renew event as an assign event for the address.

18. A non-transitory computer-readable medium according to claim 16, wherein a de-assign event for an address results in closing of an open address-to-host binding for the address.

19. A non-transitory computer-readable medium according to claim 18, wherein a de-assign event is indicated by any one of a release message, a delete message and an expiration message, the release message being issued by a host when the host's use of an address has ended, the delete and expiration messages being issued by an address-assignment server to indicate ending of a allotted period of host use of an address.

20. A non-transitory computer-readable medium according to claim 18, wherein an assign event for an address to a given host includes, in the event that an open address-to-host binding for the address and a different host exists, closing the existing open address-to-host binding for the address and the different host.

21. A non-transitory computer-readable medium according to claim 16, wherein:

the address-assignment activity for an address includes a renew event occurring between the assign event and the de-assign event; and a renew event for an address is processed by updating the end time of an open address-to-host binding for the address, the end time being updated to a timestamp for the renew event.

22. A non-transitory computer-readable medium according to claim 12, wherein the host identifier includes a hostname and a media access controller address uniquely identifying a network interface circuit used by a host.

23. A method according to claim 1, wherein the logs of network activity include a plurality of Dynamic Host Configuration Protocol (DHCP) logs generated by multiple DHCP servers, wherein each of the DHCP logs includes a plurality of entries, wherein each entry has a timestamp generated by the one of the DHCP servers that generated the DHCP log containing the entry, and further comprising:

generating a sanitized DHCP log from each DHCP log by sanitizing the time information in each of the DHCP logs so that all timestamps are relative to a standard time by for each one of the DHCP servers, generating a time configuration including a difference between a time maintained by the DHCP server and the standard time, and for each entry in each of the log files, translating the timestamp for the entry to the standard time by adding the difference between the standard time and a time maintained by the DHCP server that generated the log file containing the entry to the timestamp for the entry; and wherein the step of generating the list of known-dynamic addresses includes extracting Internet Protocol (IP) addresses from the sanitized DHCP log.

24. The method of claim 23, further comprising, for each of the DHCP servers, detecting a difference between the standard time and a time maintained by the DHCP server by:
performing a testing event on the DHCP server and recording a test event time in the standard time at which the testing event was performed;
reading a log entry created by the DHCP server in response to the testing event, wherein the log entry created by the DHCP server includes a response timestamp generated by the DHCP server; and
calculating a difference between the recorded test event time and the response timestamp.

* * * * *